United States Patent
Clay

[15] 3,695,582
[45] Oct. 3, 1972

[54] PNEUMATIC JACK FOR MOTOR VEHICLES

[72] Inventor: Robert A. Clay, Costa Mesa, Calif.

[73] Assignee: Max R. Wheeler, Costa Mesa, Calif.; a part interest

[22] Filed: Nov. 2, 1970

[21] Appl. No.: 86,035

[52] U.S. Cl. .............................................. 254/93 HP
[51] Int. Cl. ................................................. B66f 3/24
[58] Field of Search ... 254/93 R, 93 H, 93 HP; 92/34, 92/35, 42; 267/65 R, 65 A, 122

[56] References Cited

UNITED STATES PATENTS

| 2,070,960 | 2/1967 | Phillips | 254/93 HP |
| 3,565,398 | 2/1971 | Floria | 254/93 HP |
| 3,305,217 | 2/1967 | Wijgergangs | 254/93 HP |

*Primary Examiner*—Andrew R. Juhasz
*Assistant Examiner*—David R. Melton
*Attorney*—Jessup & Beecher

[57] ABSTRACT

An improved lifting jack for motor vehicles and other uses, is provided which uses fluid pressure for operating power, and which is used to raise a wheel of a motor vehicle up off the ground when the need arises to change the wheel or the tire of the vehicle. The vehicle jack of the invention is advantageous in that it incorporates a hollow flexible plastic body unit which has a closed end integral construction so as to be easy to mold, and so that air leakage problems are obviated. The jack to be described is also constructed to be compressible to a minimal height when not in use.

4 Claims, 2 Drawing Figures

PATENTED OCT 3 1972 3,695,582

PNEUMATIC JACK FOR MOTOR VEHICLES

BACKGROUND OF THE INVENTION

The prior art pneumatically operated jacks for the most part are unwieldy in their construction and difficult and unreliable to operate. The jack of the present invention is advantageous in that it includes an integral flexible hollow central body member formed of rubber, plastic, or other appropriate material, which lends itself to simple hollow body closed-end rotational molding, or other molding method, so that the jack may be fabricated easily and economically, and in order to eliminate air leakage problems.

Moreover, the resulting jack of the invention is rugged and sturdy in its construction and is reliable in its operation. In addition, the jack of the invention is constructed so that it may be compressed to a minimal height to be easily slipped under the vehicle to be lifted and for convenient storage when not in use.

The vehicle jack to be described comprises an integral flexible hollow body member composed, for example, of a suitable flexible rubber-like plastic material, such as "Plastisol." The side wall of hollow body member is shaped to define an upper and lower bellows section, and an interconnecting intermediate section of reduced diameter as compared with the maximum diameter of the individual bellows sections. A rigid band is provided around the intermediate section to prevent bulging when the jack is inflated. Rigid plates may be clamped to the ends of the body member, likewise, to prevent bulging, or other reinforcing means may be used, such as internal fabrics, wire mesh, metal strips, or the like, imbedded in the plastic material.

A pivotal U-shaped metal handle is provided in the embodiment of the vehicle jack to be described, the handle being attached to the lower end, and being used to position the jack under the vehicle, When the jack is compressed, the ends fit down into the respective bellows section. The outer diameter of the top end is preferably such that it will fit down within the confines of the aforesaid band for a minimal height of the jack when in a compressed condition. An appropriate air inlet fitting is provided in the hollow body member of the embodiment to be described. This fitting receives a hose from a pressurized fluid source, so as to permit the jack to be inflated. A "pop-off" relief valve may also be provided in the body member so as to protect the unit against excessive internal fluid pressures.

BRIEF DESCRIPTION OF THE ILLUSTRATED EMBODIMENT

FIG. 1 is a perspective representation showing a vehicle jack constructed in accordance with one embodiment of the invention, and in a partially inflated condition; and FIG. 2 is a side section of the vehicle jack of FIG. 1, and showing the jack in a fully inflated condition.

DETAILED DESCRIPTION OF THE ILLUSTRATED EMBODIMENT

As described above, the jack of the present invention includes a hollow body member which is designated 10, and which is formed, for example, of a rubber-like flexible plastic material such as "Plastisol." As described above, the hollow body member 10 has an integral construction so as to permit easy rotational molding of the member, and also to obviate any problems with respect to providing adequate seals against air leaks. The hollow body member 10 has the tubular configuration, and it comprises a tubular side wall 10a.

Figure 2:
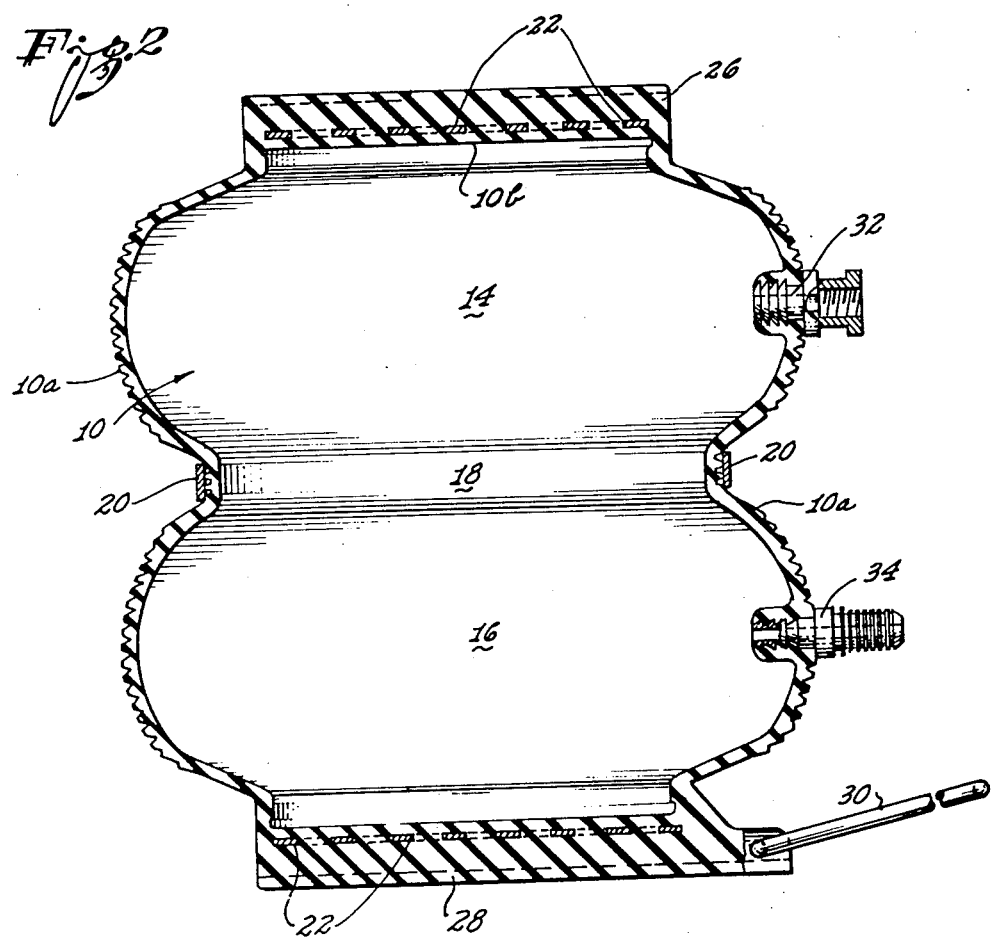

As best shown in FIG. 2, for example, the tubular side wall 10a of the hollow body member 10 is shaped to define an upper bellows section 14 and a lower bellows section 16, the two bellows sections being separated by an intermediate section 18 of reduced diameter with respect to the maximum diameter of the bellows section 14 and 16. A rigid band 20 is mounted to surround the intermediate section 18 and to prevent bulging. The band 20 may be composed, for example, of mild steel, or any other appropriate rigid material. As illustrated, the outer will of the hollow member 10 is formed into a series of peripheral ribs, which also assist in militating against bulging of the unit.

In the illustrated embodiment, an upper resilient pad 26 is formed integral with the tubular side wall 10a and a lower resilient pad 28 is formed integral with the side wall 10a. Strips 22 of metal, metal mesh, or fabric reinforcing material may be imbedded in the top and bottom walls 10a and 10b, or other appropriate means may be used to prevent bulging at the top and bottom of the member 10. As mentioned, the hollow body member 10 and its integral end pads 26 and 28 may be conveniently formed by known rotational molding techniques, and an air-tight unitary construction is assured.

Figure 1:
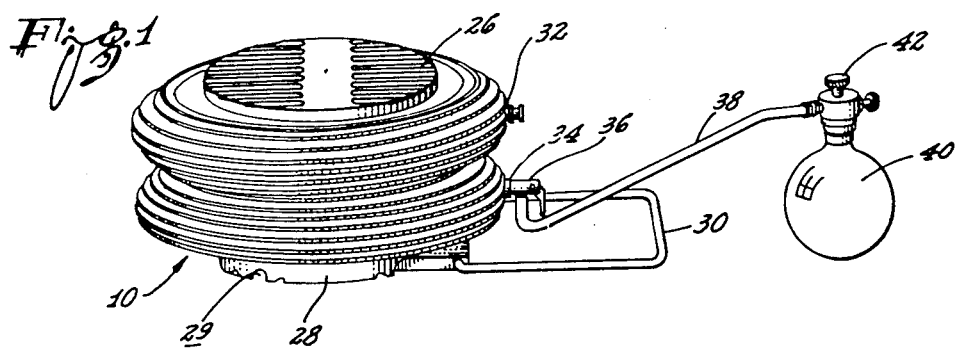

A U-shaped handle 30 composed, for example, of a rod of chrome-plated mild steel, is fitted into holes in the bottom pad 28, as best shown in FIG. 1. In addition, the bottom pad 28 may be slotted, as also shown in FIG. 1 so that the handle 30 may be folded under the bottom pad 28 to extend into the slots in the bottom pad when the unit is not is use. When the handle 30 is in the extended position, such as shown in FIGS. 1 and 2, it may be used to facilitate the positioning of the jack under the motor vehicle which is to be lifted by the unit.

A fitting 32 is imbedded into the side wall 10a of the hollow member 10 extending into the upper bellows section 14. The fitting 32 has a threaded portion which receives, for example, a relief valve 34. The relief valve 34 may be a usual spring loaded "pop-off" valve, such as known to the trade as the "Scoville Valve." Whenever the internal pressure within the member 10 becomes excessively high, the valve 34 relieves, so that there is no danger of damaging the unit due to excessive fluid pressure.

A further fitting 34 is anchored into the side wall 10a and extends into the lower bellows section 16. The lower fitting 34 is intended to receive a clamp 36 (FIG. 1) which serves to couple a hose 38 to the fitting. The hose 38 extends, for example, from a compressed air bottle 40, compressed air from the bottle 40 being selectively introduced into the jack through the hose 38 by actuation of a manually operated valve 42.

The outer diameters of the resilient end pads 26 and 28 are preferably selected so that the pads may compress down into the corresponding bellows sections 14 and 16 when the unit is not in use. Moreover, the outer diameter of the pad 26 is preferably less than the inner diameter of the restricted section 18, so that the pad 26 will fit down into a concentric relationship with the ring 20 for a minimal height of the vehicle jack, when the jack is not in use. Also, and as mentioned above, when the jack is not in use, the handle 30 may be folded under the bottom pad and into slots, such as the slot 29 in the bottom pad 28.

Then, when it is desired to use the vehicle jack described above, the handle 30 is turned out to its illustrated position in FIGS. 1 and 2, and the jack in its compressed state is moved by the handle 30 into proper position under the motor vehicle. Then, the hose 38 is coupled to the fitting 34 by the clamp 36, and the pressure valve 42 is manually depressed so that fluid pressure from the bottle 40 causes the vehicle jack 10 to inflate. As the jack 10 inflates, it assumes the position shown in FIG. 2, so that the wheel of the motor vehicle is lifted up off the ground to permit it to be replaced.

As mentioned above, a feature of the vehicle jack of the present invention is that it may be rotationally molded in a simple and inexpensive manner to provide a reliable and rugged structure, and one which is not susceptible to air leakage. Also, the construction is such that the unit may be easily compressed to a minimal height when not in use.

While a particular embodiment of the invention has been shown and described, modifications may be made. It is intended in the following claims to cover the modifications which come within the scope of the invention.

What is claimed is:

1. A pneumatically operated vehicle jack including: a hollow inflatable body member comprised of a flexible material having a tubular side wall and top and bottom end walls integral with said side wall, said side wall defining upper and lower bellows sections and an intermediate section of reduced diameter as compared with the maximum diameter of the aforesaid bellows sections; first and second resilient pads formed integral respectively with said top and bottom end walls, said resilient end pads having outer diameters such that said pads may compress down into the corresponding bellows section when said jack is in a collapsed condition; reinforcing means embedded in said top and bottom end walls to prevent bulging at the top and bottom of said body member when the jack is inflated; a rigid band surrounding said intermediate section to prevent bulging thereof when said body member is inflated; and means for introducing a pressurized fluid into the interior of said body member to inflate the jack.

2. The pneumatically operated jack defined in claim 1, and which includes a U-shaped handle pivotally coupled to the bottom of said body member.

3. The pneumatically operated jack defined in claim 1, and which includes a fitting mounted in said body member for receiving a release valve so as to protect said body member against excessive internal pressures.

4. The pneumatically operated jack defined in claim 1, in which said body member has an external surface shaped to define a plurality of peripheral ribs.

* * * * *